US012620200B2

(12) United States Patent
Zhao et al.

(10) Patent No.:    US 12,620,200 B2
(45) Date of Patent:       May 5, 2026

(54) METHOD FOR OPERATING A TECHNICAL SYSTEM AND TECHNICAL SYSTEM

(71) Applicant: Robert Bosch GmbH, Stuttgart (DE)

(72) Inventors: Jiaojiao Zhao, Amsterdam (NL); Sadaf Gulshad, Amsterdam (NL); Jan Hendrik Metzen, Boeblingen (DE); Smeulders Arnold, Amsterdam (NL)

(73) Assignee: ROBERT BOSCH GMBH, Stuttgart (DE)

( * ) Notice: Subject to any disclaimer, the term of this patent is extended or adjusted under 35 U.S.C. 154(b) by 383 days.

(21) Appl. No.: 18/340,264

(22) Filed: Jun. 23, 2023

(65) Prior Publication Data

US 2024/0005634 A1     Jan. 4, 2024

(30) Foreign Application Priority Data

Jun. 30, 2022    (DE) ..................... 10 2022 206 722.3

(51) Int. Cl.
| | |
|---|---|
| *G06V 10/764* | (2022.01) |
| *G06V 10/44* | (2022.01) |
| *G06V 10/77* | (2022.01) |
| *G06V 10/774* | (2022.01) |
| *G06V 10/82* | (2022.01) |
| *G06V 20/58* | (2022.01) |

(52) U.S. Cl.
CPC ............ *G06V 10/764* (2022.01); *G06V 10/44* (2022.01); *G06V 10/7715* (2022.01); *G06V 10/774* (2022.01); *G06V 10/82* (2022.01); *G06V 20/582* (2022.01)

(58) Field of Classification Search
CPC ............. G06V 10/764; G06V 10/7715; G06V 20/582; G06V 10/82; G06V 10/44; G06V 10/774
See application file for complete search history.

(56) References Cited

PUBLICATIONS

Metwaly, K., Kim, A., Branson, E., & Monga, V. (2022). Glidenet: Global, local and intrinsic based dense embedding network for multi-category attributes prediction. In Proceedings of the IEEE/CVF conference on computer vision and pattern recognition (pp. 4835-4846). (Year: 2022).*
Mao et al., "Towards Robust Vision Transformer," IEEE/CVF Conference on Computer Vision and Pattern Recognition (CVPR), 2021, pp. 1-12.

(Continued)

*Primary Examiner* — David Perlman
(74) *Attorney, Agent, or Firm* — NORTON ROSE FULBRIGHT US LLP

(57)         ABSTRACT
A method for operating a technical system and a technical system. The method includes providing for at least one class at least one class attribute comprising a description for members of the class, providing features characterizing a digital image, determining a class of the at least one class that classifies the digital image depending on the features, and determining at least one first attribute depending on the at least one class attribute provided for the class that classifies the digital image. The at least one first attribute includes an explanation for classifying the digital image with the class that classifies the digital image. The method further includes operating the technical system depending on the class that classifies the digital image and/or depending on the at least one first attribute.

10 Claims, 2 Drawing Sheets

(56) References Cited

PUBLICATIONS

Zhang et al., "Auto-FSL: Searching the Attribute Consistent Network for Few-Shot Learning," IEEE Transactions on Circuits and Systems for Video Technology, vol. 32, No. 3, 2022, pp. 1213-1223.
Li et al., "TokenPose: Learning Keypoint Tokens for Human Pose Estimation," 2021 IEEE/CVF International Conference on Computer Vision (ICCV), 2021, pp. 11313-11322.
Xu et al., "Where is the Model Looking at?—Concentrate and Explain the Network Attention.," IEEE Journal of Selected Topics in Signal Processing, vol. 14, No. 3, 2020, pp. 1-11.
Yuan et al., "Tokens-to-Token VIT: Training Vision Transformers From Scratch on Imagenet," Proceedings of the IEEE/CVF International Conference on Computer Vision (ICCV), 2021, pp. 1-10.

* cited by examiner capture digital image ~202 provide class attribute ~204 provide features ~206 determine class ~208 determine first attribute ~210 operate technical system ~212

METHOD FOR OPERATING A TECHNICAL SYSTEM AND TECHNICAL SYSTEM

CROSS REFERENCE

The present application claims the benefit under 35 U.S.C. § 119 of German Patent Application No. DE 10 2022 206 722.3 filed on Jun. 30, 2022, which is expressly incorporated herein by reference in its entirety.

FIELD

The present invention concerns a method for operating a technical system and technical system.

BACKGROUND INFORMATION

Neural networks predict classes on images typically without providing an explanation. It has also been shown that predictions of neural networks are not robust, that is: performance deteriorates considerably under domain shift.

Mao, X., Qi, G., Chen, Y., Li, X., Duan, R., Ye, S., He, Y., Xue, H.; "Towards robust vision transformer," arXiv preprint arXiv:2105.07926 (2021) describes general aspects of neural networks.

SUMMARY

The present invention provides a method for operating a technical system. According to an example embodiment of the present invention, the method for operating the technical system comprises providing for at least one class at least one class attribute comprising a description for members of the class, providing features characterizing a digital image, determining a class of the at least one class that classifies the digital image depending on the features, and determining at least one first attribute depending on the at least one class attribute provided for the class that classifies the digital image, wherein the at least one first attribute comprises an explanation for classifying the digital image with the class that classifies the digital image, and operating the technical system depending on the class that classifies the digital image and/or depending on the first attribute. A class attribute comprises a description for the members of the class. The at least one first attribute comprises a description of the class that is predicted for the digital image. This description explains the classification result. The at least one first attribute is a localized attribute for this digital image and by this provides an explanation of the prediction. As a by-product, this also improves the robustness of the prediction.

According to an example embodiment of the present invention, determining the class that classifies the digital image preferably comprises providing at least one attribute query, mapping the features and the at least one attribute query with a decoder to projected features, mapping the projected features with a first layer of at least one neural network to the at least one first attribute, and mapping the features with a second layer of the at least one neural network to the class that classifies the digital image. This method classifies the digital image with an attribute-guided network comprising the first and second layer. The attribute queries to predict per-image attributes and perform class predictions are learned attribute queries that are provided from within the network.

According to an example embodiment of the present invention, determining the class that classifies the digital image preferably comprises providing at least one attribute query, mapping the features and the at least one attribute query with a decoder to projected features, mapping the projected features with a first layer of at least one neural network to the at least one first attribute, and determining the class that classifies the digital image depending on a dot product between the at least one first predicted attribute and the at least one class attribute. This method classifies the digital image with an attribute-embedded network comprising the first layer. The attribute queries to predict per-image attributes and perform class predictions are learned attribute queries that are provided from within the network.

According to an example embodiment of the present invention, determining the at least one class that classifies the digital image preferably comprises providing at least one attribute query, mapping the features and the at least one attribute query with a decoder to projected features, mapping the projected features with a first layer of at least one neural network to the at least one first attribute, mapping the projected features with a second layer of the at least one neural network to at least one second attribute, and determining the class that classifies the digital image depending on a dot product between the at least one first attribute and the at least one second attribute. This method classifies the digital image with an auto-attribute network comprising the first and second layer. The attribute queries to predict per-image attributes and perform class predictions are learned attribute queries that are provided from within the network.

According to an example embodiment of the present invention, the method may further comprise training a neural network to determine the class that classifies the digital image and the at least one first attribute, wherein training comprises minimizing a mean square error between the at least one class attribute and the at least one first attribute and/or minimizing a cross-entropy loss that depends on the class that classifies the digital image.

According to an example embodiment of the present invention, providing the features may comprise providing the digital image, mapping the digital image in particular with a neural network to at least one token characterizing a local structure in the digital image, or at least one edge or at least one line in the digital image, determining an in particular fixed length output, wherein determining the fixed length output comprises reshaping the at least one token in a spatial dimension, and/or splitting the at least one token with overlapping and/or padding and a stride, determining the features with an encoder depending on the output.

According to an example embodiment of the present invention, preferably the method comprises receiving the digital image and outputting the class that classifies the digital image and the at least one first attribute. This method provides an image based perception system with increased explainability or robustness.

According to an example embodiment of the present invention, the method preferably comprises capturing the digital image with a camera, a radar sensor, a LiDAR sensor, an ultrasonic sensor, a motion sensor, a thermal image sensor and/or in that operating the technical system comprises outputting the class that classifies the digital image and/or the at least one first attribute characterizing a traffic sign, a road surface, a pedestrian, and/or a vehicle.

The present invention also provides a technical system. According to an example embodiment of the present invention, the technical system comprises at least one processor and at least one memory, wherein the at least one memory is configured to store computer-readable instructions that, when executed by the at least one processor, cause the technical system to execute steps in the method according to present invention.

According to an example embodiment of the present invention, the technical system preferably comprises a sensor for capturing the digital image, in particular a camera, a radar sensor, a LiDAR sensor, an ultrasonic sensor, a motion sensor, a thermal image sensor, and/or an output for outputting the class that classifies the digital image and/or the at least one first attribute in particular characterizing a traffic sign, a road surface, a pedestrian, and/or a vehicle.

According to an example embodiment of the present invention, a computer program comprises computer-readable instructions that when executed by a computer cause the computer to perform the method(s) according to the present invention.

Further advantageous embodiments of the present invention are derivable from the following description and the figures.

DETAILED DESCRIPTION OF EXAMPLE EMBODIMENTS

Figure 1:
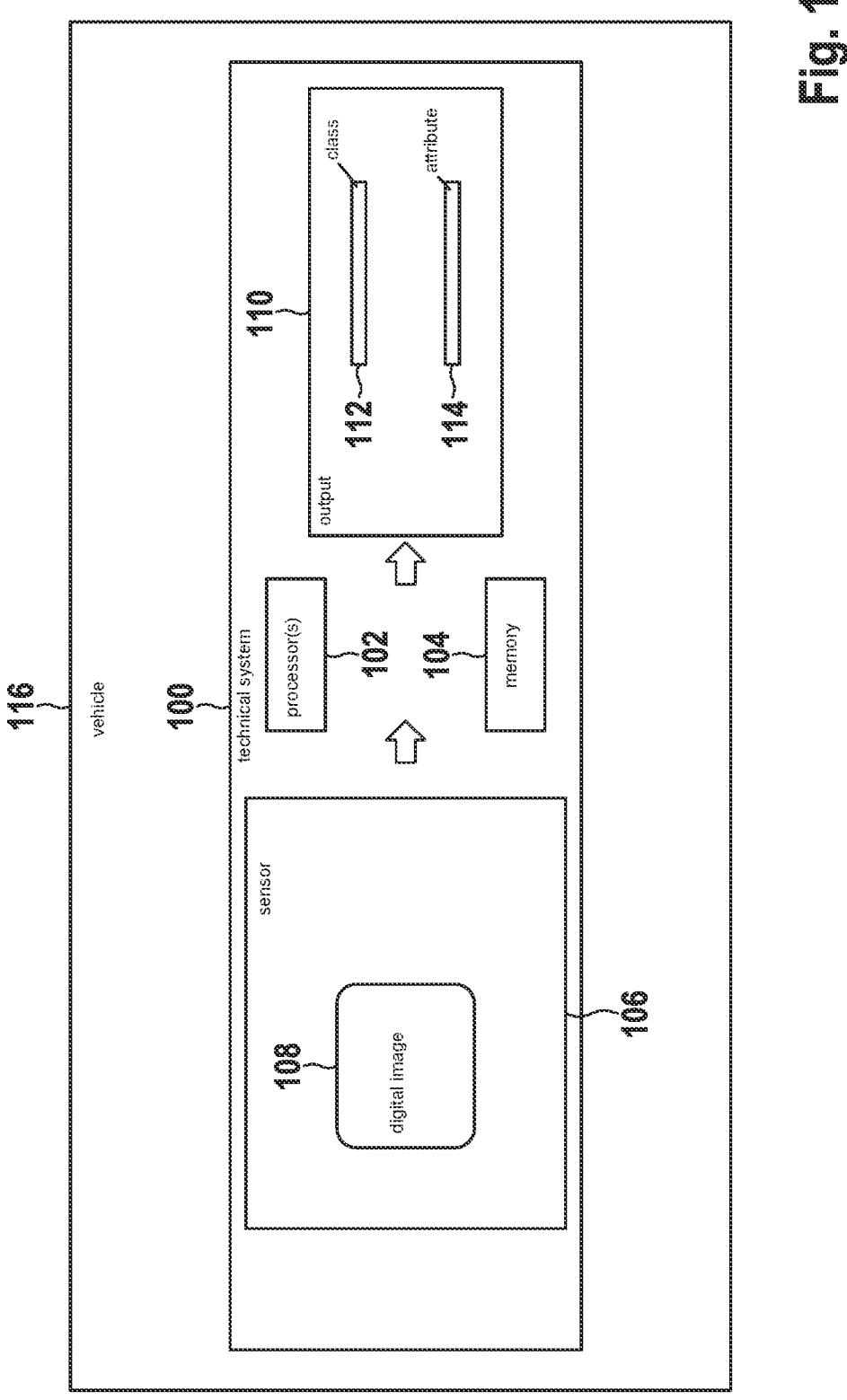
FIG. 1 schematically depicts a technical system according to an example embodiment of the present invention.

FIG. 1 depicts schematically a technical system 100. The technical system may be a physical system, in particular a computer controlled machine, e.g. a robot, preferably a vehicle, a household appliance, a power tool, a manufacturing machine, a personal assistant or an access control system.

The technical system 100 comprises at least one processor 102 and at least one memory 104.

Figure 2:
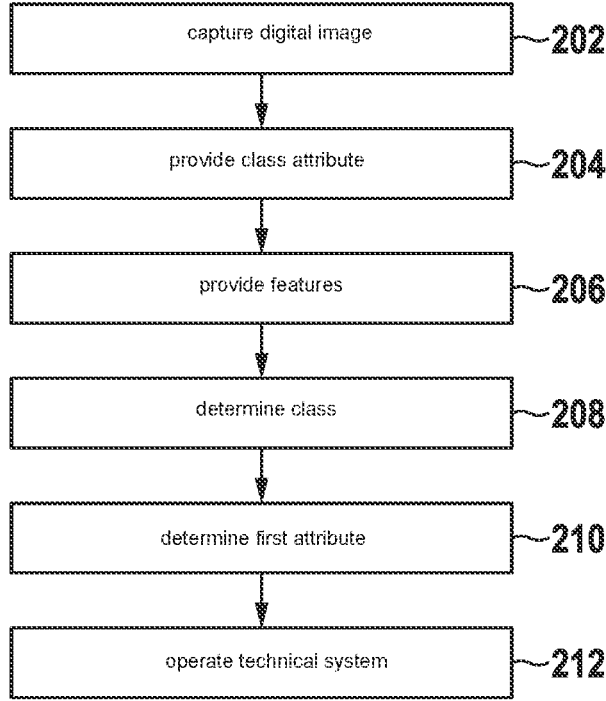
FIG. 2 depicts a flow chart with steps in a method for classifying digital images, according to an example embodiment of the present invention.

The at least one memory 104 is configured to store computer-readable instructions that, when executed by the at least one processor 102, cause the technical system 100 to execute steps in a method that is explained with reference to FIG. 2.

The technical system 100 comprises a sensor 106 for capturing a digital image 108.

The sensor 106 may be a camera, a radar sensor, a LiDAR sensor, an ultrasonic sensor, a motion sensor, a thermal image sensor.

The technical system 100 may be configured for operating depending on the class 112 that classifies the digital image and/or at least one first attribute 114.

The technical system 100 comprises an output 110 for outputting the class 112 that classifies the digital image and/or at least one first attribute 114. The output may be a display for displaying the class 112 that classifies the digital image and/or at least one first attribute 114.

The class 112 that classifies the digital image and/or the first attribute 114 may characterize a traffic sign, a road surface, a pedestrian, and/or a vehicle.

The technical system 100 may be mounted to a vehicle 116. At least a part of the technical system may be provided outside of the vehicle 116, e.g. in a backbone. The sensor 106 may be mounted to the vehicle or provided outside of the vehicle 116, e.g. in an infrastructure. The output 110 in the example is mounted to the vehicle 116.

The technical system 100 according to one example comprises at least one neural network to determine from at least one class y a class y' that classifies the digital image and at least one first attribute a'.

The at least one neural network comprises in one example a tokens-to-tokens module that is configured for mapping a digital image T to at least one token $\hat{T}$, reshaping the at least one token $\hat{T}$ in a spatial dimension, reduce a length of the at least one token while preserving its local structure, and to determine an output $T_f$ iteratively:

$$\hat{T}_i = f(T_i)$$

with a neural network f, wherein T is reshaped iteratively in the spatial dimension $$x_i = \text{reshape}(\hat{T}_i)$$
$$x_{i+1} = SoftSplit(x_i)$$

where $T \in \mathbb{R}^{l \times c}$ and $x \in \mathbb{R}^{h \times w \times c}$ and wherein SoftSplit provides $k \times k$ splits for the at least one token $x_i$ with overlapping s and/or padding p and a stride (k−s).

The neural network neural network f may be a transformer or a multilayer perceptron or a residual neural network.

Each split in this example has a size $k \times k \times c$ and the output of the SoftSplit is given to the next iteration. A first SoftSplit is performed in the example for $x_1 = SoftSplit(x_0)$.

In one example, the technical system 100 is configured for determining an in particular fixed length output $T_f$.

The tokens-to-tokens module is an example for a module that may be used for determining the output $T_f$. This output $T_f$ may be provided in a different way.

The at least one neural network comprises in one example an encoder f that is configured for providing features $f(T_f)$ of the digital image 108 depending on the output $T_f$. The encoder f that provides the features $f(T_f)$ of the digital image 108 depending on the output $T_f$ is an example for an encoder. The features of the digital image 108 may be provided in a different way.

An architecture design for the at least one neural network for perception may comprise three stages: a feature extractor/backbone, e.g. the tokens-to-tokens module, an encoder, e.g. a transformer encoder, and a decoder, e.g. a transformer decoder. The decoder may be enhanced to be able to predict attributes as detailed below:

The decoder in the example comprises an attribute-guided network, an attribute-embedded network or an auto-attribute network.

For the attribute-guided network, the attribute-embedded network and the auto-attribute network, at least one attribute query a is provided. The at least one attribute query a is provided to predict per-image attributes and perform class predictions. The attribute queries a are learned in a training that is described below. The attribute queries a are provided from within the attribute-guided network, the attribute-embedded network or the auto-attribute network.

The attribute-guided network comprises a decoder g that is configured for mapping features $f(T_f)$ and the at least one attribute query a to projected features $g(f(T_f),a)$.

The attribute-guided network comprises a first layer W that is configured for mapping the projected features $g(f(T_f), a)$ to the at least one first attribute $$a' = g(f(T_f), a)W$$

The attribute-guided network comprises a second layer V that is configured for mapping the features $f(T_f)$ to the class y' that classifies the digital image $$y' = f(T_f)V$$

The attribute-embedded network comprises a decoder g that is configured for mapping the features $f(T_f)$ and the at least one attribute query a to projected features $g(f(T_f),a)$.

The attribute-embedded network comprises a first layer W that is configured for mapping the projected features $g(f(T_f), a)$ to the at least one first attribute a'.

The attribute-embedded network is configured for determining the class y' that classifies the digital image depending on a dot product $$y' = a'\Phi(y)^T$$

between the at least one first attribute a' and the at least one class attribute $\Phi(y)$.

The auto-attribute network comprises a decoder g that is configured for mapping the features $f(T_f)$ and the at least one attribute query a to projected features $g(f(T_f),a)$.

The auto-attribute network comprises a first layer W that is configured for mapping the projected features $g(f(T_f),a)$ to the at least one first attribute a'.

The auto-attribute network comprises a second layer V that is configured for mapping the projected features $g(f(T_f), a)$ to at least one second attribute Z.

The auto-attribute network is configured for determining the class y' that classifies the digital image depending on a dot product $$y' = \frac{(z')^T a'}{\sqrt{N}}$$

between the at least one first attribute a' and the at least one second attribute z'.

The method for classifying digital images comprises a step 202.

The step 202 comprises capturing a digital image T e.g. with a camera, a radar sensor, a LiDAR sensor, an ultrasonic sensor, a motion sensor, a thermal image sensor.

Afterwards a step 204 is executed.

In the step 204, for at least one class y at least one class attribute $\Phi(y) \in \mathbb{R}^K$ is provided. The at least one class attribute comprises a description for members of the class. In the example the class attributes $\Phi(y)$ for K classes y are provided.

A class attribute comprises a description for the members of a class.

Afterwards a step 206 is executed.

In the step 206, features $f(T_f)$ characterizing the digital image T are provided.

Providing the features $f(T_f)$ comprises in one example providing the digital image T, mapping the digital image T to at least one token $\hat{T}$, reshaping the at least one token $\hat{T}$ in the spatial dimension to the output $T_f$ and determining the features $f(T_f)$ with the encoder f depending on the output $T_f$.

The step 206 may comprises receiving the digital image T.

Afterwards a step 208 is executed.

In the step 208, a class y' of the at least one class that classifies the digital image T is determined depending on the features $f(T_f)$.

For the attribute-guided network, the attribute-embedded network and the auto-attribute network, determining the class y' that classifies the image T comprises providing at least one attribute query a.

The step 208 comprises determining the at least one class either with the attribute-guided network, the attribute-embedded network or the auto-attribute network.

Afterwards a step 210 is executed.

In the step 210, at least one first attribute a' is determined depending on the at least one class attribute $\Phi(y)$ for the class y' that classifies the digital image T. The at least one first attribute a' comprises a description of the class y'. The at least one first attribute comprises an explanation for classifying the digital image T with the class y' that classifies the digital image T.

The at least one first predicted attribute a' is a localized attribute for the input digital image T and by this provides an explanation of the prediction. As a by-product, this also improves the robustness of the prediction.

Afterwards a step 212 is executed.

The step 212 comprises operating the technical system 100 depending on the class y' that classifies the digital image T and/or depending on the at least one first attribute a'.

The step 212, comprises outputting the class y' that classifies the digital image T and the at least one first attribute a'.

This method provides an image based perception system with increased explainability or robustness.

The step 212 may comprise outputting the class y' that classifies the digital image T characterizing a traffic sign, a road surface, a pedestrian, and/or a vehicle.

The step 212 may comprise outputting the at least one first attribute a' characterizing a traffic sign, a road surface, a pedestrian, and/or a vehicle.

Afterwards the step 202 may be executed.

In a training, the at least one neural network is trained to determine the class y' that classifies the digital image T and the at least one first attribute a'.

Training comprises in one example minimizing a mean square error $$L_{attr} = \|a' - \Phi(y)\|_2^2$$

between the at least one class attribute $\Phi(y)$ and the at least one first attribute a'.

Training comprises in one example minimizing a cross-entropy loss $$L_{cls} = \frac{-\exp(y_i')}{\sum_j^N \exp(y_j')}$$

that depends on the class y' that classifies the digital image T.

Preferably, the total loss to train the neural network is $$L = L_{attr} + L_{cls}$$

The at least one neural network is for example trained depending on measurement data with class attribute $\Phi(y)$ ground-truth.

By way of example, the at least one neural network is trained for recognizing traffic signs in images. This is explained for a stop sign that has an octagonal shape, a red background color and a white text, namely "STOP" in the foreground. In this example, the class y' that classifies the digital image T is "stop sign" and the at least one first attribute a' comprises "octagonal", "red background", and/or "white text".

Other traffic signs may be treated alike with a corresponding class that classifies the digital image T and at least one attribute.

Preferable, several first attributes a' are determined for the class y' that classifies the digital image T.

What is claimed is:

1. A method for operating a technical system, the method comprising the following steps:

providing, for at least one class, at least one class attribute including a description for members of the class;

providing features characterizing a digital image;

determining a class of the at least one class that classifies the digital image depending on the features;

determining at least one first attribute depending on the at least one class attribute provided for the class that classifies the digital image, wherein the at least one first attribute includes an explanation for classifying the digital image with the class that classifies the digital image; and operating the technical system depending on the class that classifies the digital image and/or depending on the at least one first attribute, wherein the determining of the class that classifies the digital image includes:

providing at least one attribute query;

mapping the features and the at least one attribute query with a decoder to projected features;

mapping the projected features with a first layer of at least one neural network to the at least one first attribute; and mapping the features with a second layer of the at least one neural network to the class that classifies the digital image.

2. The method according to claim 1, further comprising:

training a neural network to determine the class that classifies the digital image and the at least one first attribute, wherein the training includes minimizing a mean square error between the at least one class attribute and the at least one first attribute and/or minimizing a cross-entropy loss that depends on the class that classifies the digital image.

3. The method according to claim 1, further comprising:

receiving the digital image; and outputting the class that classifies the digital image and the at least one first attribute.

4. The method according to claim 1, further comprising:

capturing the digital image with a camera and/or a radar sensor and/or a LiDAR sensor and/or an ultrasonic sensor and/or a motion sensor and/or a thermal image sensor; and/or the operating of the technical system includes outputting the class that classifies the digital image and/or the at least one first attribute characterizing a traffic sign and/or a road surface and/or a pedestrian and/or a vehicle.

5. A method for operating a technical system, the method comprising the following steps:

providing, for at least one class, at least one class attribute including a description for members of the class;

providing features characterizing a digital image;

determining a class of the at least one class that classifies the digital image depending on the features;

determining at least one first attribute depending on the at least one class attribute provided for the class that classifies the digital image, wherein the at least one first attribute includes an explanation for classifying the digital image with the class that classifies the digital image; and operating the technical system depending on the class that classifies the digital image and/or depending on the at least one first attribute, wherein the determining of the class that classifies the digital image includes:

providing at least one attribute query;

mapping the features and the at least one attribute query with a decoder to projected features;

mapping the projected features with a first layer of at least one neural network to the at least one first attribute; and determining the class that classifies the digital image depending on a dot product between the at least one first attribute and the at least one class attribute.

6. A method for operating a technical system, the method comprising the following steps:

providing, for at least one class, at least one class attribute including a description for members of the class;

providing features characterizing a digital image;

determining a class of the at least one class that classifies the digital image depending on the features;

determining at least one first attribute depending on the at least one class attribute provided for the class that classifies the digital image, wherein the at least one first attribute includes an explanation for classifying the digital image with the class that classifies the digital image; and operating the technical system depending on the class that classifies the digital image and/or depending on the at least one first attribute, wherein the determining of the class that classifies the digital image includes:

providing at least one attribute query;

mapping the features and the at least one attribute query with a decoder to projected features;

mapping the projected features with a first layer of at least one neural network to the at least one first attribute;

mapping the projected features with a second layer of the at least one neural network to at least one second attribute; and determining the class that classifies the digital image depending on a dot product between the at least one first attribute and the at least one second attribute.

7. A method for operating a technical system, the method comprising the following steps:

providing, for at least one class, at least one class attribute including a description for members of the class;

providing features characterizing a digital image;

determining a class of the at least one class that classifies the digital image depending on the features;

determining at least one first attribute depending on the at least one class attribute provided for the class that classifies the digital image, wherein the at least one first attribute includes an explanation for classifying the digital image with the class that classifies the digital image; and operating the technical system depending on the class that classifies the digital image and/or depending on the at least one first attribute, wherein the providing of the features includes:

providing the digital image;

mapping the digital image with a neural network to at least one token characterizing a local structure in the digital image, or at least one edge or at least one line in the digital image;

determining a fixed length output, wherein the determining of the fixed length output includes reshaping the at least one token in a spatial dimension, and/or splitting the at least one token with overlapping and/or padding and a stride, determining the features with an encoder depending on the output.

8. A technical system for classifying digital images, the technical system comprising:

at least one processor; and at least one memory, wherein the at least one memory is configured to store computer-readable instructions that, when executed by the at least one processor, cause the technical system to perform the following steps:

providing, for at least one class, at least one class attribute including a description for members of the class;

providing features characterizing a digital image;

determining a class of the at least one class that classifies the digital image depending on the features;

determining at least one first attribute depending on the at least one class attribute provided for the class that classifies the digital image, wherein the at least one first attribute includes an explanation for classifying the digital image with the class that classifies the digital image; and operating the technical system depending on the class that classifies the digital image and/or depending on the at least one first attribute, wherein the determining of the class that classifies the digital image includes:

providing at least one attribute query;

mapping the features and the at least one attribute query with a decoder to projected features;

mapping the projected features with a first layer of at least one neural network to the at least one first attribute; and mapping the features with a second layer of the at least one neural network to the class that classifies the digital image.

9. The technical system according to claim 8, further comprising:

a sensor configured to capture the digital image, the sensor including a camera sensor and/or a radar sensor and/or a LiDAR sensor and/or an ultrasonic sensor and/or a motion sensor and/or a thermal image sensor; and/or an output configured to output the class that classifies the digital image and/or the at least one first attribute characterizing a traffic sign and/or a road surface and/or a pedestrian and/or a vehicle.

10. A non-transitory computer-readable medium on which is stored a computer program including computer-readable instructions for operating a technical system, the instructions, when executed by computer, causing the computer to perform the following steps:

providing, for at least one class, at least one class attribute including a description for members of the class;

providing features characterizing a digital image;

determining a class of the at least one class that classifies the digital image depending on the features;

determining at least one first attribute depending on the at least one class attribute provided for the class that classifies the digital image, wherein the at least one first attribute includes an explanation for classifying the digital image with the class that classifies the digital image; and operating the technical system depending on the class that classifies the digital image and/or depending on the at least one first attribute, wherein the determining of the class that classifies the digital image includes:

providing at least one attribute query;

mapping the features and the at least one attribute query with a decoder to projected features;

mapping the projected features with a first layer of at least one neural network to the at least one first attribute; and mapping the features with a second layer of the at least one neural network to the class that classifies the digital image.

* * * * *